United States Patent [19]

Schiefer

[11] Patent Number: 4,482,277
[45] Date of Patent: Nov. 13, 1984

[54] EXPANSION ANCHOR ASSEMBLY

[75] Inventor: Erwin Schiefer, Munich, Fed. Rep. of Germany

[73] Assignee: Hilti Aktiengesellschaft, Schaan, Liechtenstein

[21] Appl. No.: 468,368

[22] Filed: Feb. 22, 1983

[30] Foreign Application Priority Data

Feb. 22, 1982 [DE] Fed. Rep. of Germany ....... 3206290

[51] Int. Cl.³ .............................................. F16B 13/04
[52] U.S. Cl. ...................................... 411/42; 411/39; 411/63
[58] Field of Search ................. 411/60, 39, 42, 73, 411/71, 64, 63, 68

[56] References Cited

U.S. PATENT DOCUMENTS

| 1,499,072 | 6/1924 | Pleister | 411/60 |
| 2,293,491 | 8/1942 | Cox | 411/61 |
| 2,709,389 | 5/1955 | Kleij | 411/60 |
| 3,750,526 | 8/1973 | Lerich | 411/61 |
| 3,766,819 | 10/1973 | Giannuzzi | 411/60 |
| 3,922,947 | 12/1975 | Leonardo et al. | 411/60 |
| 4,287,807 | 9/1981 | Pacharis et al. | 411/42 |

FOREIGN PATENT DOCUMENTS

| 953546 | 8/1974 | Canada | 411/64 |
| 1318704 | 1/1963 | France | 411/71 |
| 556980 | 12/1974 | Switzerland | 411/71 |
| 12749 | 10/1914 | United Kingdom | 411/42 |
| 905941 | 9/1962 | United Kingdom | 411/61 |
| 1211245 | 11/1970 | United Kingdom | 411/60 |

Primary Examiner—Thomas J. Holko
Assistant Examiner—Rodney M. Lindsey
Attorney, Agent, or Firm—Toren, McGeady and Stanger

[57] ABSTRACT

An expansion anchor assembly is made up of an anchor bolt and an expansion sleeve encircling and secured in an annular recess on the bolt. Adjacent the annular recess, the anchor bolt has a frusto-conical section. The expansion sleeve has diametrically opposite reduced thickness wall sections with a projection extending outwardly of the surface of the sleeve along each of the reduced thickness wall sections. When the expansion anchor assembly is inserted into a prepared borehole and the frusto-conical section is drawn into the sleeve, the sleeve breaks into axially extending sections along the reduced thickness wall sections and a uniform contact is provided between the sleeve section and the borehole surface.

11 Claims, 7 Drawing Figures

EXPANSION ANCHOR ASSEMBLY

SUMMARY OF THE INVENTION

The present invention is directed to an expansion anchor assembly made up of an essentially cylindrically shaped anchor bolt and an expansion sleeve encircling and secured in an annular recess in the anchor bolt. The anchor bolt has an axially extending frusto-conical section extending from the annular recess and widening in the direction away from the recess. The expansion sleeve is a hollow cylinder and has reduced thickness sections which form predetermined breaking regions. The reduced thickness sections are formed in the side surface of the expansion sleeve so that the inside surface of the reduced thickness section is spaed radially outwardly from the surface of the annular recess in the anchor bolt.

Expansion anchor assemblies of this type are used in large numbers, because of their economical construction and the ease with which they can be set. These anchor assemblies are used in a great many different fields. High strength concrete is usually the receiving material into which the anchor assemblies are set.

In this type of expansion anchor assembly, the expansion sleeve which encloses the anchor bolt in an annular recess formed in the bolt, is radialy expanded to achieve the anchoring effect. Accordingly, the expansion sleeve has a slot which extends over its full axial length. To achieve as uniform as possible a radial widening, the expansion sleeve is also provided with a reduced thickness or weakened section opposite the slot, and this reduced thickness section forms a predetermined breaking line when the sleeve is expanded.

The setting procedure is effected by inserting the expansion anchor assembly so that the expansion sleeve is located within a cylindrical bore in a receiving material. When the anchor bolt is subsequently retracted or pulled out of the bore, such as by means of a nut screwed onto a threaded end section of the anchor bolt projecting out of the bore, the frusto-conical section of the bolt moves into the expansion sleeve which is temporarily held in the bore, such as by a prestressing action. The expansion sleeve experiences radially directed stress and breaks along the reduced thickness or weakened section. If breakage occurs, the separated, half-shell shaped sections are pressed against the wall of the bore by the frusto-conical section of the anchor bolt as the anchor bolt is retracted or pulled out of the bore.

Based on experience, it has been noted that the predetermined breaking locations do not respond reliably in the known expansion anchor assemblies. In some instances, the expansion sleeve remains intact when the frusto-conical section of the bolt moves into the sleeve. The surface of the expansion sleeve has uneven contact as it continues to expand, that is, it is deflected toward the surface of the bore primarily in the region between the slot and the reduced thickness section. An uneven distribution of the anchoring pressure results.

In hard receiving materials, such as conentional concrete, only relatively low anchoring values can be attained, since there is only a partial application of force relative to the capacity of the receiving material. Due to this pressure distribution characteristic, and also when the expansion anchor assembly is used in low strength receiving materials as compared to conventional concrete, only low anchoring values are achieved relative to the specified force capacity of the expansion anchor assembly. The uneven pressure distribution leads to locally excessive stresses on the receiving material so that the receiving material tends to spall causing the anchor to be displaced out of the bore.

Therefore, it is the primary object of the present invention to provide an expansion anchor assembly which is easy to set in place and is distinguished by a uniform application of force against the surface of the bore into which it is placed so that high anchoring values can be achieved in receiving materials of different strength.

In accordane with the present invention, in the region of the reduced thickness or weakened cross-section, a projection is provided extending outwardly from the cylindrical outer surface of the expansion sleeve.

Preferably, one or more cam-like shaped projections are provided extending along the weakened cross-sectional regions of the sleeve at its outer cylindrical surface. When the expansion anchor assembly is inserted into a bore, the projections contact the bore surface. Subsequently, when the frusto-conical section of the bolt is drawn into the expansion sleeve, of necessity, the projections press radially inwardly against the reduced thickness or weakened cross-sectional areas providing a reliable breakage of the sleeve. The axially extending sleeve sections formed in this manner are pressed uniformly against the surface of the bore during the continuous expansion of the sleeve. As a result, a uniform application force over the entire circumference of the expanding sleeve takes place within the bore.

When this expansion anchor assembly is used in conventionally hard concrete, a comparatively higher anchoring value can be achieved due to the pressure distribution over a large surface. In lower strength receiving materials, the uniform pressure distribution permits a higher expanding force which creates comparatively high anchoring values.

When the cross-sectional weakening or reduced thickness sections extend over the entire or major part of the axial length of the expansion sleeve, then it is preferable if the projection also extends along the length of the weakened section. Where a projection extends continuously over the full length of the cross-sectionally weakened section, it increase the certainty that the sleeve breaks along its entire length at the predetermined breaking location. After the sleeve breaks along the weakened section, the weakened section along with the projection move radially inwardly into the resulting slot-like open space between the sleeve sections. Accordingly, the projection does not impair the anchoring of the sleeve surface to the surface of the bore.

The expansion sleeve is securely held on the anchor bolt when the sleeve does not have a longitudinal slot. Further, it is advantageous if the expansion sleeve has two diametrically opposite cross-sectional weakened or reduced thickness sections with a projection extending along each section. Such an arrangement assures the formation of two axially extending sleeve sections due to the breakage along the weakened sections, so that a completely uniform pressure distribution takes place along the cylindrical surface of the expansion sleeve.

The projection may extend radially outwardly from the sleeve across the width of the weakened or reduced diameter section, that is, it extends for the full circumferential dimension of the section. It is advantageous to form the cross-sectionally weakened sections by forming dies. The edge transition between the reduced thickness or recessed zones formed in such an operation relative to the adjacent undeformed section affords a breaking region.

In one embodiment of the invention, the projection is constructed as a web with a smaller circumferential width than that of the cross-sectionally weakened section. Such an arrangement facilitates breakage of the weakened section. The weakened section, in addition, is advantageously formed so that its thickness varies in the circumferential direction of the expansion sleeve. In this manner, the separation along the predetermined breaking region can be controlled as desired in connection with the formation and arrangement of the reduced thickness section.

In another embodiment of the invention, the expansion sleeve is divided into sections by means of axially extending highes formed in the expansion sleeve and spaced between two adjacent projections. As a result, the hinges have a swivel axis extending parallel to the sleeve axis. When the sleeve ruptures along the predetermined breaking regions as the anchor assembly is being set, the sections formed in the breaking operation are deformable to a large extent due to the hinges so that practically an ideal, uniformly circular contact of the outside surface of the expansion sleeve and the surface of the bore is attained.

The hinges can be produced by providing sleeve parts which hook into one another. By providing a snap connection between the hinge parts, even after the separation takes place along the predetermined breaking regions, a secure hinge engagement is maintained, and this hinge construction permits a simple assembly of the expanding sleeve during the manufacture of the expansion anchor assembly.

The various features of novelty which characterize the invention are pointed out with particularity in the claims annexed to and forming a part of this disclosure. For a better understanding of the invention, its operating advantages and specific objects attatined by its use, reference should be had to the accompanying drawings and descriptive matter in which there are illustrated and described preferred embodiments of the invention.

DETAIL DESCRIPTION OF THE INVENTION

Figure 1:
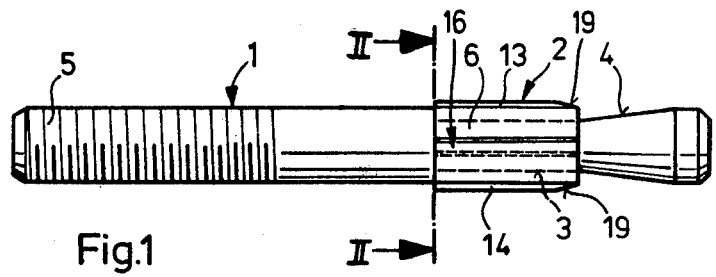
FIG. 1 is an axially extending side view of an expansion anchor assembly embodying the present invention with the assembly ready to be inserted.

In FIG. 1 an expansion anchor assembly is illustrated made up of an axially elongated anchor bolt 1 and an expansion sleeve 2 mounted on the bolt. The main axially extending portion of the anchor bolt is cylindrically shaped and it has a circular recess 3 adjacent to the frusto-conically shaped section 4 adjacent the leading end of the bolt. As viewed in FIG. 1, the right-hand end of the bolt is its leading end, that is the end which is inserted first into a borehole. The frusto-conical section 4 tapers outwardly toward the leading end of the bolt. The cylindrically shaped section of the bolt extending from the recess 3 to the trailing end is provided with a thread 5 running from the trailing end. A nut, not shown, can be screwed onto the thread 5.

Figure 2:
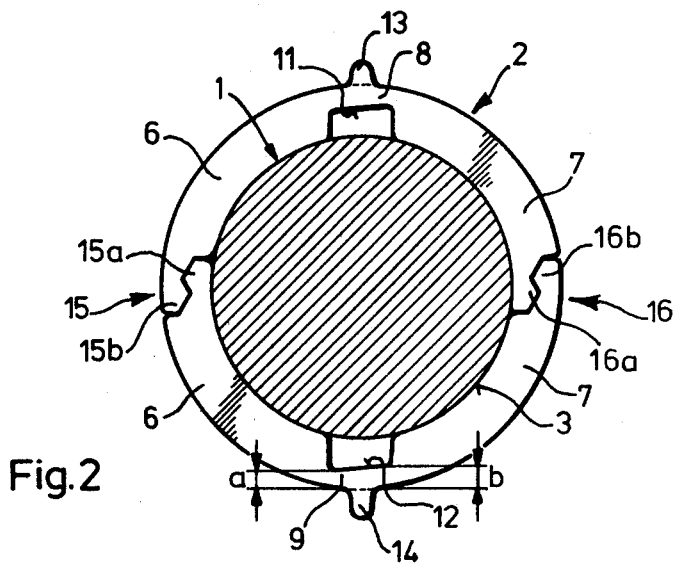
FIG. 2 is an enlarged cross-sectional view through the expansion anchor assembly taken along II—II in FIG. 1.

As shown in FIG. 2, expansion sleeve 2 is made up of two sleeve half sections 6, 7 secured together at diametrically opposite location by reduced thickness sections 8, 9 which provides weakened sections extending along the sleeve. The reduced thickness section 8, 9 are in the form of recesses or grooves 11, 12 extending outwardly from the inside surface of the sleeve and the grooves have a generally rectangular cross-section extending in the axial direction of the sleeve . The reduced thickness sections 8, 9 formed by the groove 11, 12 define predetermined breaking regions extending along the axial direction of the sleeve. The depth of the grooves 11, 12 increases in one circumferential direction so that the wall of the sleeve 2 has a residual thickness a at one side of the groove smaller than residual thickness b at the other side of the groove. As shown in the lower portion of FIG. 2, the thickness a extends along the groove half section 6 while the other thickness b extends along the sleeve half section 7. On the outside surface of the sleeve half sections 6 and 7, in the area of the reduced thickness sections 8, 9, projections in the form of axially extending, rib-shaped webs 13, 14 are provided. Each sleeve half section 6, 7 is divided in the axial direction equidistantly spaced from the reduced thickness sections by means of hinges 15, 16. Accordingly, each sleeve half section is made up of two parts secured together by the hinges 15, 16. The hinges are formed by projections 15a, 15b, 16a, 16b which interlock with one another.

Figure 2A:
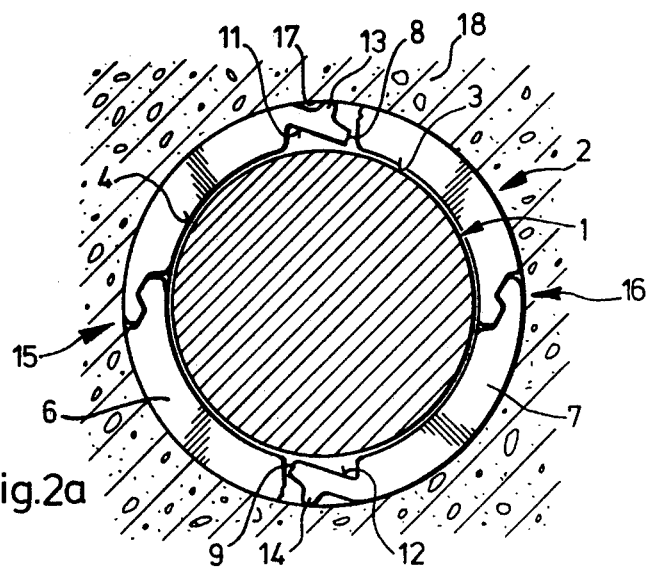
FIG. 2a is a sectional view similar to that shown in FIG. 2 taken along the line II—II of FIG. 1, however, the expansion anchor assembly has been set in place.

To set the expansion anchor assembly, it is inserted into a previously prepared bore 17, note FIG. 2a, in a receiving material 18 and the diameter of the bore is not sigificantly larger than the diameter of the anchor bolt. The webs 13, 14 on the expansion sleeve 2 project slightly outwardly beyond the outside surface of the sleeve and, as can be seen in FIG. 1, also beyond the outside surface of the section of the anchor bolt extending to the trailing end. The outside surface of the sleeve 2 has approximately the same diameter as the adjacent axially extending cylindrically shaped surface of the anchor bolt 1. As the expansion anchor assembly is inserted into the bore 17, the webs 13, 14 dig into the surface of the bore and provide a preliminary or temporary holding action within the receiving material 18.

To facilitate the insertion of the expansion sleeve 2 into the opening into the bore 17, the leading ends 19 of the webs are beveled.

With the anchor bolt 1 of the expansion anchor assembly inserted into the bore a sufficient distance so that the sleeve 3 is located interiorly of the opening into the bore, the nut is run onto the thread 5 until it bears against the surface of the receiving material 18. As the nut is tightened onto the thread 5 while it contacts the surface of the receiving material 18, the frusto-conical section 4 is drawn in the direction out of the bore so that it moves into the expansion sleeve 2 which is held within the bore by the webs 13, 14. As the frusto-conical section 4 moves into the sleeve, the sleeve begins to expand radially outwardly. The radially projecting webs 13, 14 forced against the surface of the bore 17 provide increasing compressive stress on the predetermined breaking regions formed by the reduced thickness sections 8, 9 until the smaller residual thickness a is unable to withstand the stress after a small amount of expansion has taken place, with the result that the sleeve ruptures along the edges of the grooves 11, 12 defined by the smaller thickness a. The rupture of the reduced thickness sections 8, 9 is shown in FIG. 2a. When the rupture takes place, the web 13, 14 and the wall portions of the expansion sleeve outwardly of the grooves 11, 12 deflect inwardly into the space left by the grooves, note FIG. 2a.

As the anchor bolt 1 continues to move rearwardly into the sleeve 2 the breaking apart of the sleeve half sections 6, 7, continues and the outside surfaces of the sleeve half sections are displaced radially outwardly against the surface of the bore 17 in the receiving material 18. The hinge 15, 16 permit the hinged parts of the sleeve half sections 6, 7 to swivel outwardly and adapt their diameter to the diameter of the anchor bolt which widens as the frusto-conical section continues to move rearwardly within the bore through the sleeve. As a consequence, the outside surface of the sleeve half sections rest for their full circular extent against the inside surface of the bore 17 and thus afford the uniform application of force which assures a high anchoring value.

The further embodiments of the expansion anchor assembly, shown in detail in FIGS. 3 to 6, differ with regard to the assembly shown in FIG. 1, only with regard to the expansion sleeve. Accordingly, only the expansion sleeve is provided with new reference numerals.

Figure 3:
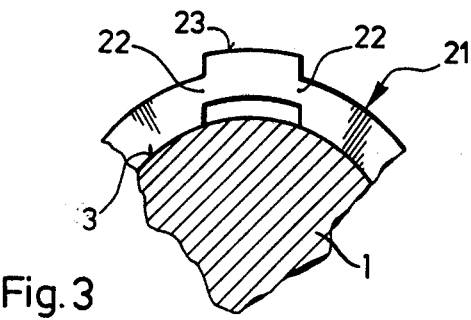
FIG. 3 is a detail of a partial cross-section of an expansion anchor assembly, similar to that in FIG. 2, with a different construction of the expansion sleeve.

In FIG. 3 the inside surface of the expansion sleeve 21 is seated along its axial length within the cylindrical recess 3 in the anchor bolt 1. A two-sided cross-sectional groove forms a reduced thickness section 22 which is formed by means of dies with a radially outwardly directed projection 23 extending for the full circumferential width of the two-sided groove forming the reduced thickness section 22.

Figure 4:
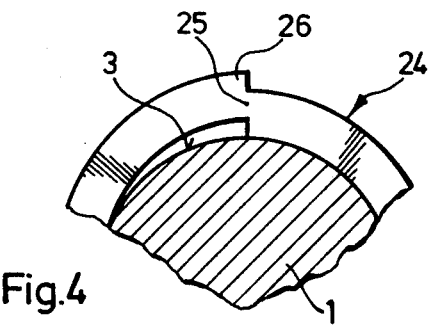
FIG. 4 is a partial sectional view similar to FIG. 3, showing an expansion anchor assembly like the one in FIG. 2, but with a different construction of the expansion sleeve.

In the embodiment in FIG. 4, a reduced thickness section 25 provides a weakened section in the expansion sleeve 24 defining a saw-toothed like zone. The shaped configuration of the reduced thickness section 25 is provided by forming dies. As a result, radially outwardly from the reduced thickness section 25 there is a projection 26 so that when expansion takes place a rupture of the sleeve occurs along the reduced thickness section 25 in the wall of the sleeve.

Figures 5, 6:
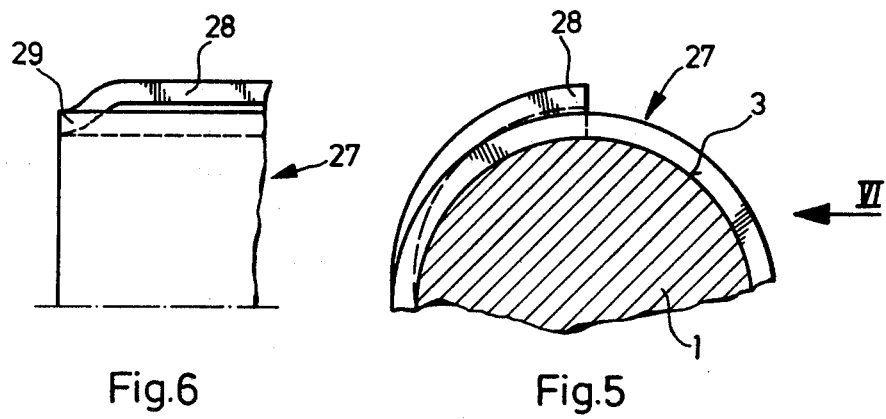
FIG. 5 is a partial sectional view similar to the expansion anchor assembly in FIG. 2, however, with a different construction of the expansion sleeve.
FIG. 6 is a side view of the expansion sleeve shown in FIG. 5 taken in the direction of the arrow VI in FIG. 5.

The embodiment in FIG. 5 is similar to the one shown in FIG. 4. In this embodiment, an expansion sleeve 27 has a saw-tooth like projection 28 produced by forming dies. The projection 28 is connected by means of two cross-sectionally weakened sections 29 at each end of the expansion sleeve 27. In FIG. 6 only one of the weakened sections 29 is shown.

Preferably, each of the expansion sleeves illustrated in FIGS. 3 to 6 has, similar to the embodiment shown in FIG. 1 to 2a, two diametrically oppostie projections. The comment on the function of the sleeve provided above with regard to the embodiment of FIGS. 1 to 2a also apply with respect to the other embodiments.

While specific embodiments of the invention have been shown and described in detail to illustrate the application of the inventive principles, it will be understood that the invention may be embodied otherwise without departing from such principles.

I claim:

1. An expansion anchor assembly comprising an axially extending anchor bolt and an axially extending expansion sleeve, said anchor bolt having a first end and a second end, said anchor bolt has a cylindrically shaped outside surface for an axial portion thereof extending from the first end, and a frusto-conicaly shaped outside surface extending from adjacent the second end toward the first end with said frusto-conically shaped surface tapering inwardly toward the first end, a cylindrically shaped annular recess in said anchor bolt extending from the smaller diameter end of said frusto-conically shaped surface toward the first end, said recess has a smaller diameter than the cylindrically shaped outside surface extending from the first end, said expansion sleeve is a hollow cylinder and is positioned in said annular recess and encircles said anchor bolt, said expanion sleeve has an inside surface and an outside surface and said expansion sleeve has an axially and circumferentially extending region in the inside surface thereof recessed outwardly from the surface of said annular recess forming a reduced thickness wall section acting as a predetermined breaking location for said expansion sleeve, wherein the improvement comprises that said inside surface of said expansion sleeve is cylindrically shaped and fits closely around said cylindrically shaped annular recess in said anchor bolt, in the circumferentially extending region of said reduced thickness wall section a projection is formed extending radially outwardly from the cylindrically shaped outside surface of said expansion sleeve.

2. An expansion anchor assembly, as set forth in claim 1, wherein said projection extends in the axial direction of said sleeve along said reduced thickness wall section.

3. An expansion anchor assembly, as set forth in claim 2, wherein two diametrically oposite reduced thickness wall sections are provided in said expansion sleeve with one said projection associated with each of said reduced thickness wall sections.

4. An expansion anchor assembly, as set forth in claim 2, wherein said projection is in the form of a web having a smaller dimension in the circumferential direction of said expansion sleeve than said reduced thickness wall setion.

5. An expansion anchor assembly, as set forth in claim 3, wherein said reduced thickness wall sections divide said expansion sleeve into two half sections, and a hinge provided in each said half section spaced between said reduced thickness wall sections, and said hinges each form a swivel axis extending parallel to the axis of said expansion sleeve.

6. An expansion anchor assembly, as set forth in claim 2, wherein said reduced thickness wall sections are formed by axially extending grooves provided in the inside surface of said expansion sleeve.

7. An expansion anchor assembly, as set forth in claim 6, wherein said grooves are substantially rectangular in cross-section extending transversely of the axial direction of said expansion sleeve.

8. An expansion anchor assembly, as set forth in claim 7, wherein one generally radially extending side of said groove is longer than the other radially extending side of said groove so that the reduced thickness wall section remaining varies in thickness across the circumferential direction of said groove in said expansion sleeve.

9. An expansion anchor assembly, as set forth in claim 2, wherein said projection has a dimension in the circumferential direction of said expansion sleeve substantially equal to the comparable dimension of said reduced thickness wall section.

10. An expansion anchor assembly, as set forth in claim 2, wherein said projection has a saw-tooth like configuration.

11. An expansion anchor assembly, as set forth in claim 10, wherein said projection is secured to said sleeve at the opposite axial ends thereof and is separated from said sleeve between said ends.

* * * * *